(12) United States Patent
Chen et al.

(10) Patent No.: US 8,022,569 B2
(45) Date of Patent: Sep. 20, 2011

(54) SYSTEMS AND METHODS FOR DISCHARGING BUS VOLTAGE USING SEMICONDUCTOR DEVICES

(75) Inventors: Keming Chen, Torrance, CA (US); Christopher P. Henze, Lakeville, MN (US); Stephen Raiser, Wiesbaden (DE); George R. Woody, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 12/256,808

(22) Filed: Oct. 23, 2008

(65) Prior Publication Data
US 2010/0102638 A1 Apr. 29, 2010

(51) Int. Cl.
*B60L 3/00* (2006.01)
*H01H 47/00* (2006.01)
*H02J 7/00* (2006.01)
(52) U.S. Cl. .................. 307/10.1; 307/115; 320/135
(58) Field of Classification Search .................. 307/10.1, 307/115; 320/135
See application file for complete search history.

(56) References Cited

U.S. PATENT DOCUMENTS
7,057,361 B2 6/2006 Kitahata et al.
7,327,053 B2 2/2008 Eckardt et al.

FOREIGN PATENT DOCUMENTS
DE 69117006 T2 9/1996
DE 10063084 A1 7/2002
JP 2007312456 A 11/2007

OTHER PUBLICATIONS
German Office Action for German Application 10 2009 049 977.6-32 mailed Nov. 24, 2010.

*Primary Examiner* — Rexford N Barnie
*Assistant Examiner* — Dru M Parries
(74) *Attorney, Agent, or Firm* — Ingrassia Fisher & Lorenz, P.C.

(57) ABSTRACT

Systems and methods are provided for discharging a high-voltage bus using semiconductor devices. A discharge system for a first voltage rail and a second voltage rail comprises a first semiconductor device coupled to a first voltage rail and a second semiconductor device coupled between the first semiconductor device and a second voltage rail. A control circuit is coupled to the first semiconductor device and the second semiconductor device. In response to a discharge condition, the control circuit is configured to activate the first semiconductor device and gradually activate the second semiconductor device, such that the energy potential between the first voltage rail and the second voltage rail is gradually dissipated through the semiconductor devices.

20 Claims, 2 Drawing Sheets

SYSTEMS AND METHODS FOR DISCHARGING BUS VOLTAGE USING SEMICONDUCTOR DEVICES

TECHNICAL FIELD

Embodiments of the subject matter described herein relate generally voltage discharge circuits, and more particularly, embodiments of the subject matter relate to discharge circuits suitable for use in discharging high-voltage bus capacitance found in electric and hybrid vehicles.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

In most hybrid vehicles, energy storage devices, such as capacitors, are often used to improve efficiency by capturing energy within the powertrain system or supplying additional power during periods of operation when a primary energy source cannot supply the required power quickly enough. For example, regenerative braking may be used to capture energy by converting kinetic energy to electrical energy and storing the electrical energy in a bank of capacitors for later use. In order to accommodate high-voltage operation within automobiles, capacitor banks or supercapacitors are often used because they have the ability to quickly store energy and can be discharged at a much higher rate than other energy sources. However, capacitors may retain a charge after power is removed from a circuit or an automobile is turned off. Therefore, high-voltage capacitors should be properly discharged after turning off a vehicle or before accessing the equipment housing the capacitors.

Discharging a capacitor is typically accomplished by placing a discharge or bleed resistor across the capacitor or bus terminals in parallel. In addition to requiring additional components, these designs also require discharge resistors with the ability to handle high average power dissipation. These resistors generally occupy a larger surface area and often require additional harnesses, connectors, and heat sinks, which prevent the discharge resistors from being built on a circuit board. In addition to the increased spatial requirements, these discharge circuits are not utilized during most normal operating modes.

BRIEF SUMMARY

An apparatus is provided for a discharge system for a first voltage rail and a second voltage rail. An energy potential exists between the first voltage rail and the second voltage rail. The discharge system comprises a first semiconductor device coupled to the first voltage rail and a second semiconductor device coupled between the first semiconductor device and the second voltage rail. A control circuit is coupled to the first semiconductor device and the second semiconductor device. The control circuit is configured to activate the first semiconductor device in response to a discharge condition, and gradually activate the second semiconductor device in response to the discharge condition, such that the energy potential is gradually dissipated through the semiconductor devices.

In another embodiment, an apparatus is provided for an electrical system for use in a vehicle. The electrical system comprises a capacitance between a first voltage rail and a second voltage rail. The electrical system further comprises an inverter module having a phase leg including a first transistor coupled to the first voltage rail and a second transistor coupled between the first transistor and the second voltage rail. A control circuit is coupled to the inverter module. The control circuit is configured to apply a constant voltage to the gate terminal of the first transistor, the constant voltage being greater than the threshold voltage of the first transistor. The control circuit is further configured to apply a control voltage to the gate terminal of the second transistor. The control voltage is initially less than the threshold voltage of the second transistor, and the control circuit is configured to gradually increase the control voltage to a voltage greater than the threshold voltage, such that the second transistor is gradually activated and energy stored by the capacitance is gradually dissipated through the transistors.

A method is provided for discharging an energy potential between a first voltage rail and a second voltage rail using an inverter phase leg coupled between the first voltage rail and the second voltage rail. The inverter phase leg is controlled by a gate driver circuit. The method comprises detecting a discharge condition and setting gate driver circuit controlling the inverter phase leg to a discharge mode in response to the discharge condition, wherein the energy potential is gradually dissipated through the inverter phase leg.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
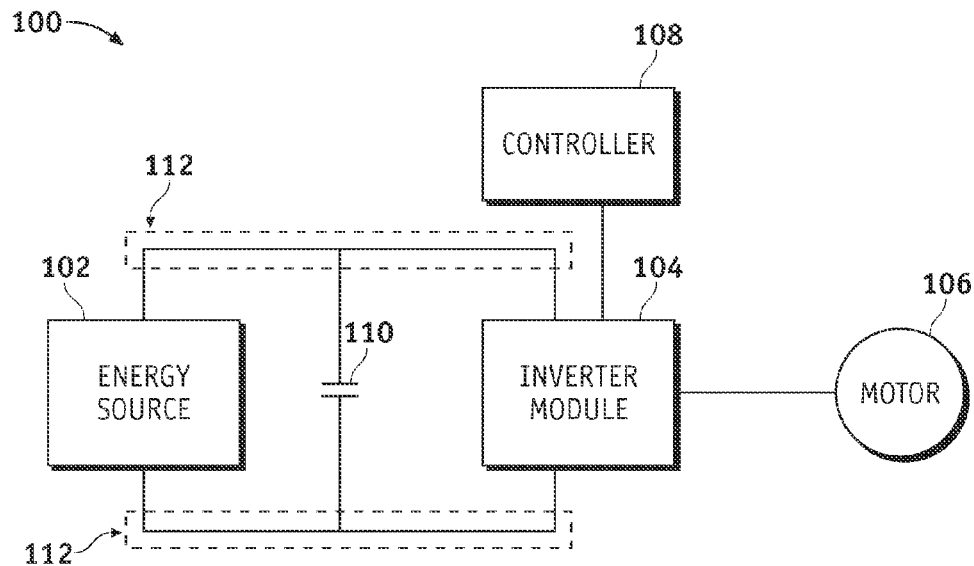
FIG. 1 is a block diagram of an exemplary electrical system suitable for use in a vehicle in accordance with one embodiment.

The following detailed description is merely illustrative in nature and is not intended to limit the embodiments of the subject matter or the application and uses of such embodiments. Although the embodiments of the subject matter are discussed herein in the context of vehicle drive systems, the subject matter may apply to alternative implementations in other applications. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

For the sake of brevity, conventional techniques related to signaling, transistor-based switch control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and/or concepts described herein relate generally to systems and methods for discharging high-voltages that exist in electric circuits, architectures, and systems, such as, for example, electric and hybrid vehicle drive systems. Various functionality and features of automotive drive systems are well known and so, in the interest of brevity, many conventional aspects will only be mentioned briefly herein or will be omitted entirely without providing the well known details.

FIG. 1 illustrates an electrical system 100 suitable for use in a vehicle, in accordance with one embodiment. The electrical system 100 includes, without limitation, an energy source 102, an inverter module 104, a motor 106, and a controller 108. The inverter module 104 provides AC power to the motor 106 from the energy source 102 under control of the controller 108. In an exemplary embodiment, at least one capacitor 110 is provided between the energy source 102 and inverter module 104 for capturing energy within the electrical system 100, as will be understood. It should be understood that FIG. 1 is a simplified representation of the electrical system 100, and FIG. 1 is not intended to limit the subject matter described herein.

In an exemplary embodiment, the energy source 102 is coupled to the inverter module 104 and capacitor 110 via a high-voltage bus 112. The high-voltage bus 112 may be realized as a pair of conductive elements, such as wires, cables, or busbars. A first conductive element of the bus 112 corresponds to a positive reference voltage and a second conductive element corresponds to a negative reference voltage, wherein the difference between the positive reference voltage and the negative reference voltage is considered to be the voltage of the bus 112. In various embodiments, the high-voltage bus 112 has a voltage that may range from 300 volts to 500 volts or higher during normal operation of the electrical system 100. Although not illustrated in FIG. 1, in practice, there may be a switch coupled between the energy source 102 and the high-voltage bus 112, which may in turn be opened to decouple the energy source 102 and allow high-voltage stored on the capacitor 110 and/or within the electrical system 100 to be discharged, as will be appreciated in the art.

Depending on the embodiment, the energy source 102 may be realized as a battery or battery pack, a fuel cell or fuel cell stack, one or more capacitors (e.g., an ultracapacitor or capacitor bank), or another suitable voltage source. Although FIG. 1 depicts a single energy source 102, in practice, numerous energy sources may be present. The motor 106 may be realized as an electric motor, a generator, a traction motor, or another suitable motor known in the art. The motor 106 may be an induction motor, a permanent magnet motor, or another type of motor suitable for the desired application.

In an exemplary embodiment, the inverter module 104 includes at least one phase leg. As described in greater detail below in the context of FIG. 2, an inverter phase leg includes a pair of switches, each switch having a freewheeling diode associated therewith, and an output node between sets of switches and diodes. It should be understood that although the inverter module 104 may be described herein in the context of an individual phase leg, in practice, the inverter module 104 may include any number of phase legs. In an exemplary embodiment, the output node of an inverter phase leg is coupled to a phase of the motor 106, wherein the inverter 104 is configured to convert DC voltage from the high-voltage bus 112 (e.g., DC voltage provided by energy source 102) into an AC voltage for powering the motor 106, as is commonly understood in the art.

In an exemplary embodiment, the controller 108 is in operable communication and/or electrically coupled to the inverter 104. The controller 108 is responsive to commands received from the driver or operator of the vehicle (e.g., via an accelerator pedal) or alternatively, commands received from the electronic control system (not shown) within the vehicle. The controller 108 provides commands to the inverter 104 to control the output at the output node of the inverter phase leg by employing high frequency pulse width modulation (PWM) of the switches, as is understood in the art. Depending on the embodiment, the controller 108 may be realized as hardware, software, firmware, or various combinations thereof.

Figure 2:
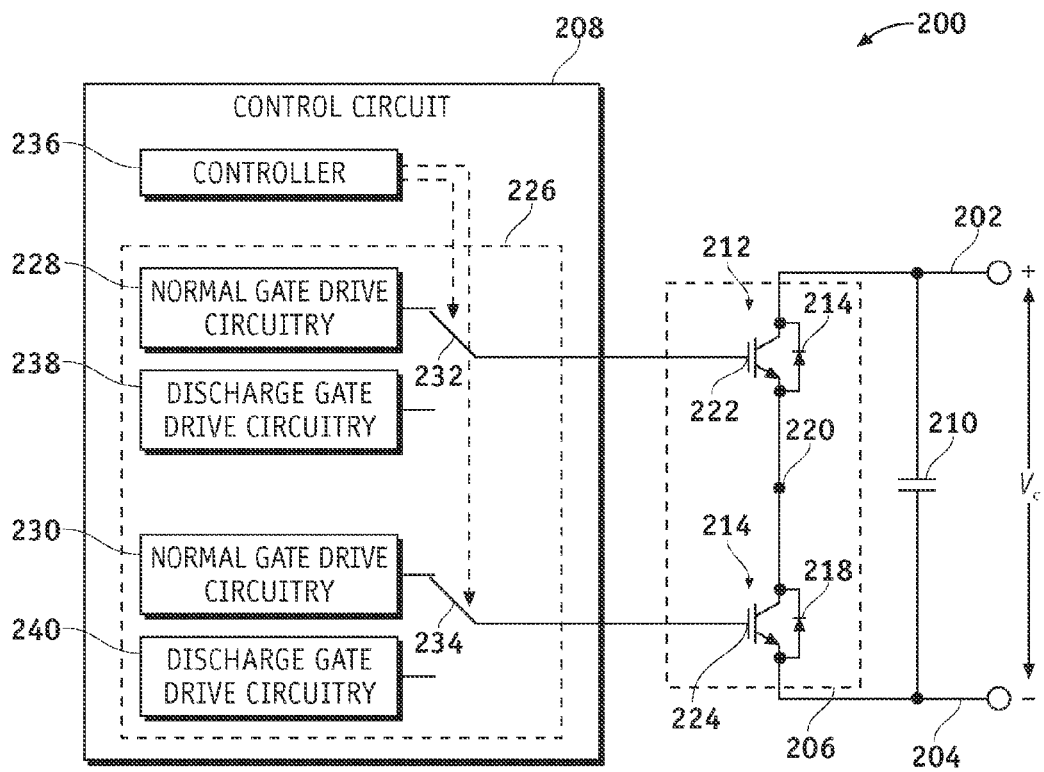
FIG. 2 is block diagram of a discharge system in accordance with one embodiment.

Referring now to FIG. 2, in an exemplary embodiment, a discharge system 200 suitable for use in the electrical system 100 includes, without limitation, a high-voltage bus (e.g., bus 112) having a pair of voltage rails 202, 204, an inverter phase leg 206, and a control circuit 208. A capacitance, such as at least one capacitance element 210, may be coupled electrically parallel to the inverter phase leg 206 between the voltage rails 202, 204, such that a stored energy potential, $V_C$, exists between the voltage rails 202, 204. In an exemplary embodiment, the control circuit 208 is configured to discharge the stored energy potential using the inverter phase leg 206 in response to a discharge condition, as described in greater detail below.

In an exemplary embodiment, the inverter phase leg 206 includes a pair of semiconductor devices 212, 216 and a pair of diodes 214, 218 coupled between the voltage rails 202, 204 with an output node 220 located between the semiconductor devices 212, 216. A first semiconductor device 212 is coupled to the first voltage rail 202 and the output node 220. A first freewheeling diode 214 is coupled between the first voltage rail 202 and the output node 220. In an exemplary embodiment, the first semiconductor device 212 and diode 214 are antiparallel, meaning they are electrically in parallel with reversed or inverse polarity. The antiparallel configuration allows for bidirectional current flow while blocking voltage unidirectionally, as will be appreciated in the art. In this configuration, the direction of current through the first semiconductor device 212 is opposite to the direction of allowable current through the freewheeling diode 214. A second semiconductor device 216 is coupled between the output node 220 (e.g., the second semiconductor device 216 may be coupled to the first semiconductor device 212) and the second voltage rail 204. A second freewheeling diode 218 is coupled between the output node 220 and the second voltage rail 204, such that the second semiconductor device 216 and freewheeling diode 218 are antiparallel. In practice, the output node 220 may be coupled to a winding of a motor (e.g., motor 106) for driving a phase of the motor with inverter phase leg 206, as will be appreciated in the art. It should be further appreciated that although FIG. 2 depicts a single inverter phase leg 206, in practice, multiple inverter phase legs may be present.

In an exemplary embodiment, the semiconductor devices 212, 216 are realized as transistors. Preferably, the semiconductor devices 212, 216 are realized as insulated-gate bipolar transistors (IGBTs), although in some embodiments, the semiconductor devices 212, 216 may be realized as field-effect transistors (FETs). FIG. 2 illustrates an exemplary configuration of the semiconductor devices 212, 216 and diodes 214, 218 for N-channel transistor semiconductor devices 212, 216. For clarity and ease of explanation, the subject matter will be described herein in terms of an N-channel configuration, however, it will be appreciated in the art that the subject matter may be implemented using P-channel devices in a similar manner.

In an exemplary embodiment, the first semiconductor device 212 is a transistor having a first gate terminal 222 and an associated threshold voltage, $v_{TH1}$. The first semiconductor device 212 allows current flow (i.e., the semiconductor device 212 is turned on) when a voltage applied to the first gate terminal 222 exceeds the threshold voltage, $v_{TH1}$. Similarly, the second semiconductor device 216 has a second gate terminal 224 and an associated threshold voltage, $v_{TH2}$, wherein the second semiconductor device 216 allows current flow when voltage applied to the second gate terminal 224 exceeds the threshold voltage, $v_{TH2}$. In accordance with one embodiment, the semiconductor devices 212, 216 are identical transistor devices (e.g., same manufacturer and model) such that $v_{TH1}$ and $v_{TH2}$ are substantially equal.

In an exemplary embodiment, the control circuit 208 includes a gate driver circuit 226 coupled to the gate terminals 222, 224 of the respective semiconductor devices 212, 216. The control circuit 208 is configured to utilize high frequency pulse width modulation (PWM) to alternately activate (i.e., turn on) the semiconductor devices 212, 216 to produce an AC voltage at the output node 220, as will be understood. In this regard, the gate driver circuit 226 may include normal gate drive circuitry 228, 230 that can be selectively and controllably coupled to the gate terminals 222, 224 of a respective semiconductor device 212, 216. Although not illustrated, the normal gate drive circuitry 228, 230 may be configured to employ high frequency PWM under the control of another device (e.g., controller 108), as will be appreciated in the art.

In an exemplary embodiment, the normal gate drive circuitry 228, 230 is coupled to the gate terminals 222, 224 via switches 232, 234. In this configuration, when the switches 232, 234 are in a state such that the normal gate drive circuitry 228, 230 is coupled to the semiconductor devices 212, 216, the gate driver circuit 226 may be understood as being in a normal operating mode.

In an exemplary embodiment, the control circuit 208 includes a controller 236 coupled to the switches 232, 234. The controller 236 is configured to detect a discharge condition and set the gate driver circuit 226 to a discharge mode in response to the discharge condition. As used herein, a discharge condition should be understood as a situation where it is desirable to discharge a voltage (e.g., $V_C$) that may be stored within an electrical system to protect against electrostatic discharge or other negative effects. For example, a discharge condition may be an attempt to access a unit or compartment containing a high-voltage component, a vehicle crash or accident, or turning off of a vehicle housing the electrical system. Although not illustrated, the controller 236 may be configured to detect the discharge condition using one or more sensors or receive an input signal indicative of a discharge condition from another vehicle module, such as an electronic control unit. As described below, in the discharge mode, the gate driver circuit 226 is configured to gradually dissipate the energy potential between the voltage rails 202, 204 (i.e., $V_C$) to a safe level within a specified period of time using the inverter phase leg 206 without damaging the semiconductor devices 212, 216.

In an exemplary embodiment, the gate driver circuit 226 includes discharge gate drive circuitry 238, 240 coupled to the switches 232, 234. The controller 236 may be configured to set the gate driver circuit 226 to discharge mode by activating (or changing the state of) switches 232, 234 in order to couple the discharge gate drive circuitry 238, 240 to the gate terminals 222, 224 of the respective semiconductor device 212, 216. In this configuration, when the switches 232, 234 are in a state such that the discharge gate drive circuitry 238, 240 is coupled to the semiconductor devices 212, 216, the gate driver circuit 226 may be understood as being in the discharge mode. In an exemplary embodiment, the first discharge gate drive circuitry 238 is configured to activate the first semiconductor device 212 and the second discharge gate drive circuitry 240 is configured to gradually activate the second semiconductor device 216, such that the energy potential between the voltage rails 202, 204 is gradually dissipated through the semiconductor devices 212, 216. In an alternate and equivalent embodiment, the second discharge gate drive circuitry 240 may be configured to activate the second semiconductor device 216 and the first discharge gate drive circuitry 238 configured to gradually activate the first semiconductor device 212, such that the energy potential between the voltage rails 202, 204 is gradually dissipated through the semiconductor devices 212, 216.

Figure 3:
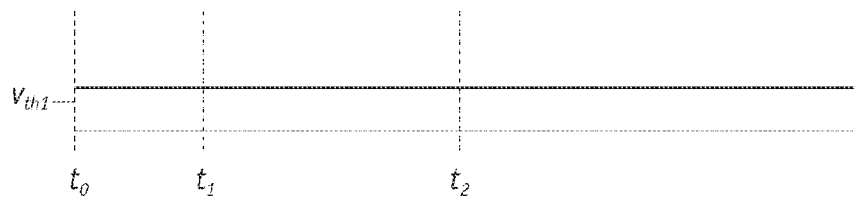
FIG. 3 is a graph of an exemplary control voltage versus time suitable for controlling a semiconductor device in the discharge system of FIG. 2 in accordance with one embodiment.
Figure 4:
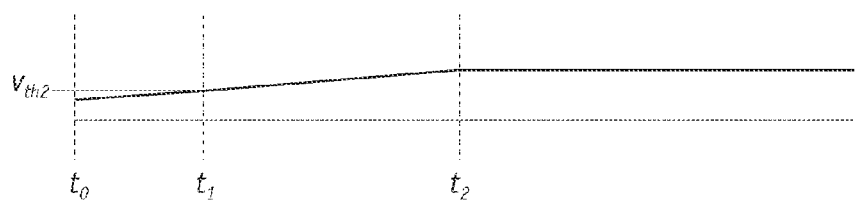
FIG. 4 is a graph of an exemplary control voltage versus time suitable for controlling a semiconductor device in the discharge system of FIG. 2 in accordance with one embodiment.
Figure 5:
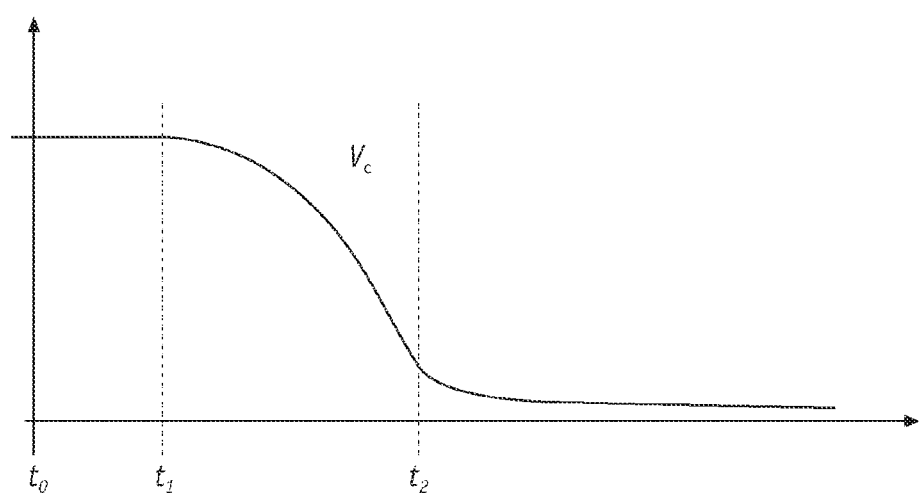
FIG. 5 is a graph of bus voltage versus time associated with the discharge of a high-voltage bus in an exemplary embodiment.

Referring now to FIG. 3, FIG. 4, and FIG. 5, and with continued reference to FIG. 2, in an exemplary embodiment, the controller 236 is configured activate the switches 232, 234 in response to detecting a discharge condition at time $t_0$. The first discharge gate drive circuitry 238 is configured to apply a constant voltage to the gate terminal 222 of the first semiconductor device 212 as shown in FIG. 3. The constant voltage is greater than the threshold voltage, $v_{TH1}$, for the semiconductor device 212, such that the semiconductor device is capable of conducting current (i.e., turned on). Preferably, the constant voltage is only slightly greater than the threshold voltage, $v_{TH1}$, such that the first semiconductor device 212 operates in a sub-saturation mode, which may alternatively be referred to as the linear or ohmic mode. In this sub-saturation mode, the first semiconductor device 212 has a higher resistance than it would otherwise have in the saturation mode at higher gate voltages. In accordance with one embodiment, the constant voltage exceeds the threshold voltage by an amount ranging from approximately 2.5% to 5% of the threshold voltage. For example, for a threshold voltage of 4 Volts, the constant voltage may be 0.1 to 0.2 Volts above the threshold. As the gate voltage is increased, the semiconductor device 212 discharges more energy and will increase in temperature, as will be appreciated in the art. Thus, the constant voltage should be adjusted to meet the desired discharge time while keeping the temperature of the semiconductor device 212 low enough to prevent a failure.

As shown in FIG. 4, in an exemplary embodiment, the second discharge gate drive circuitry 240 is configured to apply a control voltage to the gate terminal 224 of the second semiconductor device 216. At time $t_0$, the control voltage is initially less than the threshold voltage, $v_{TH2}$, of the second semiconductor device 216, such that the second semiconductor device 216 is not activated (i.e., it is off). The second discharge gate drive circuitry 240 is configured to gradually increase the control voltage, such that the second semiconductor device 216 is gradually activated and the stored energy is gradually dissipated through the semiconductor devices 212, 216. In this regard, the second discharge gate drive circuitry 240 gradually increases the control voltage to a voltage greater than the threshold voltage, $v_{TH2}$, by time $t_2$. In accordance with one embodiment, the second discharge gate drive circuitry 240 maintains a constant control voltage after time $t_2$. As used herein, "gradually activated" means that the control voltage is increased in an incremental manner, such that a gradually activated semiconductor device responds by gradually allowing an increased amount of current to flow from source to drain as the gate voltage increases and the semiconductor device approaches saturation.

In an exemplary embodiment, the capacitance element 210 may be realized as a capacitor (or a bank of capacitors) or another electrical load in a vehicle that is coupled to the voltage rails 202, 204 (e.g., high-voltage bus 112). The capacitance element 210 stores and/or retains an electrical energy potential or voltage, $V_C$, even when not connected to an energy source.

As shown in FIG. 5, at time $t_1$, when the control voltage on the second gate terminal 224 crosses the threshold voltage, $v_{TH2}$, the energy potential between the two voltage rails 202, 204 (i.e., the energy stored in capacitance element 210) begins to be dissipated through the two semiconductor devices 212, 216 which are turned on. In the situation where the capacitance element 210 comprises a capacitor or another capacitive load, the voltage between the two voltage rails 202, 204, $V_C$, decays exponentially. In accordance with one embodiment, the resistance of the second semiconductor device 216 decreases as the control voltage increases over time $t_1$ to $t_2$, such that the voltage discharge curve shown in FIG. 5 resembles an RC circuit with a varying resistance, as will be appreciated in the art. In an exemplary embodiment, the controller 236 is configured to detect when the discharge condition no longer exists and switch the gate driver circuit 226 back to the normal operating mode by switching the switches 232, 234.

Referring back to FIG. 4, in an exemplary embodiment, the second discharge gate drive circuitry 240 increases the control voltage linearly (e.g., a ramp function) as shown in FIG. 4. Alternatively, the second discharge gate drive circuitry 240 may increase the control voltage logarithmically, quadratically, exponentially, or in another manner suitable for the particular discharge system. Preferably, the second discharge gate drive circuitry 240 is configured such that the control voltage smoothly crosses the threshold voltage to protect against a potentially damaging immediate discharge through the semiconductor devices 212, 216. In accordance with one embodiment, the initial control voltage at time $t_0$ is determined by subtracting a tolerance value, from the threshold value, $v_{TH2}$ to ensure reliable operation of the discharge system 200. The tolerance value may be based on the various tolerances associated with the semiconductor device 216. For example, the tolerance value may be based on the threshold voltage range data provided in a manufacturer data sheet for the device, operating temperature variations, and other environmental factors that may affect device performance. Similarly, the final control voltage at time $t_2$ may be determined by adding a tolerance value to the threshold value, $v_{TH2}$.

In an exemplary embodiment, the voltage levels for the constant voltage and control voltage along with the time period from $t_0$ to $t_2$ are adjusted such that the stored energy potential is sufficiently dissipated to a desired level within a specified time period. For example, in an automotive application, the voltage between the voltage rails 202, 204 may be between 300 to 400 volts and potentially higher. In an exemplary embodiment, the discharge system 200 is configured to discharge a voltage of 300 to 400 volts to a lower level of around 40 volts or less within three seconds. Furthermore, it should be appreciated that the voltage applied to the gate terminal 222 of the first semiconductor device 212 need not be constant, and in fact, in one or more alternative embodiments, the same discharge gate function may be used for both semiconductor devices 212, 216.

Although not illustrated, the control circuit 208 may include additional circuitry or functionality to protect the discharge system 200 during fault conditions. For example, if an energy source is connected across the voltage rails 202, 204, the control circuit 208 may be able to detect a failure to discharge and apply zero (or negative) voltage to the gate terminals 222, 224 to prevent the semiconductor devices 212, 216 from overheating. The control circuit 208 may be configured to wait a period of time before attempting to resume discharge of the high-voltage bus.

In accordance with one embodiment, the controller 236 is configured to control normal operation of the inverter phase leg 206 and/or the gate driver 226, for example, by providing signals to modify the PWM duty cycle of the normal gate drive circuitry 228, 230, as will be appreciated in the art. In this regard, in accordance with another embodiment, the controller 236 may be configured to discharge the voltage rails 202, 204 without use or inclusion of discharge gate circuitry 238, 240 or switches 232, 234. For example, in response to detecting a discharge condition, the controller 236 may modify the duty cycle of the first normal gate drive circuitry 228 for the first semiconductor device 212 such that the first semiconductor device 212 is turned on (e.g., applying a constant voltage great enough to cause the device to operate in a saturation mode). The controller 236 may then modify the duty cycle of the second normal gate drive circuitry 230 such that the second semiconductor device 216 is repeatedly turned on for very short periods of time (e.g., pulsed). The normal gate drive circuitry 230 may repeatedly apply a voltage pulse at the gate terminal 224 of the second semiconductor device 216 that has a limited duration such that the second semiconductor device 216 does not operate in a saturation mode. For example, the normal gate drive circuitry 230 may be configured to turned on or pulse the second semiconductor device 216 for approximately 500 nanoseconds to one microsecond. Because the gate driver 226 takes a finite amount of time to reach the gate voltage required for the device to operate in the saturation mode, if the duration of the discharge pulse is chosen for a short enough time period, the second semiconductor device 216 operates in the sub-saturation mode (e.g., in the linear or ohmic region) such that it gradually dissipates energy from the high-voltage bus 202, 204.

It will be appreciated in the art that the duration of the voltage pulse should be adjusted to obtain the desired discharge characteristics without damaging the semiconductor device 216. However, in some embodiments, the gate driver 226 may already include cross-conduction or de-saturation detection circuitry which may protect the semiconductor devices 212, 216 if the width of the discharge pulse is chosen to be too large. The controller 236 and/or normal gate drive circuitry 230 may be configured to turn on (e.g., operate in saturation mode) the second semiconductor device 216 to complete the discharge once the voltage on the bus 202, 204 is sufficiently discharged to a level that is safe for both devices 212, 216.

One advantage of the system and/or method described above is that the discharge system allows a high-voltage bus to be discharged without requiring additional discharge components, such as discharge resistors or relays. Furthermore, discharge system may be implemented in a manner that allows for a fast discharge of the bus while also minimizing the power absorption or stress on the semiconductor devices. Additionally, the systems and methods described above may be utilized in different types of automobiles, different vehicles (e.g., watercraft and aircraft), or in other electrical systems altogether, as it may be implemented in any situation where a high-voltage bus needs to be reliably discharged.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A discharge system for a first voltage rail and a second voltage rail, wherein an energy potential exists between the first voltage rail and the second voltage rail, the discharge system comprising:
   a first semiconductor device coupled to the first voltage rail;
   a second semiconductor device coupled between the first semiconductor device and the second voltage rail; and
   a control circuit coupled to the first semiconductor device and the second semiconductor device, the control circuit being configured to:
      activate the first semiconductor device in response to a discharge condition; and
      gradually activate the second semiconductor device in response to the discharge condition, such that the energy potential is gradually dissipated through the first semiconductor device and the second semiconductor device.

2. The discharge system of claim 1, wherein the control circuit comprises a first gate drive coupled to a gate terminal of the first semiconductor device, the first gate drive being configured to apply a constant voltage to the gate terminal, wherein the constant voltage is greater than a threshold voltage for the first semiconductor device.

3. The discharge system of claim 2, wherein the control circuit comprises:
   a first switch coupled to the first semiconductor device; and
   a controller coupled to the first switch, the controller being configured to activate the first semiconductor device in response to the discharge condition by activating the first switch.

4. The discharge system of claim 2, wherein the constant voltage is less than a saturation voltage for the first semiconductor device.

5. The discharge system of claim 1, wherein the control circuit comprises a second gate drive coupled to a gate terminal of the second semiconductor device, the second gate drive being configured to apply a control voltage to the gate terminal, wherein the second gate drive gradually varies the control voltage between a first voltage and a second voltage, the first voltage being less than a threshold voltage of the second semiconductor device and the second voltage being greater than the threshold voltage.

6. The discharge system of claim 5, wherein the control circuit comprises:
   a second switch coupled to the second semiconductor device; and
   a controller coupled to the second switch, the controller being configured to activate the second semiconductor device in response to the discharge condition by activating the second switch.

7. The discharge system of claim 5, wherein the second gate drive is configured to linearly vary the control voltage from the first voltage to the second voltage.

8. The discharge system of claim 7, wherein the second gate drive varies the control voltage over a time period being less than three seconds.

9. The discharge system of claim 5, wherein the second voltage is less than a saturation voltage for the second semiconductor device.

10. The discharge system of claim 1, wherein the first semiconductor device and the second semiconductor device comprise an inverter phase leg.

11. The discharge system of claim 1, further comprising a capacitor coupled between the first voltage rail and the second voltage rail, wherein the energy potential is stored in the capacitor.

12. An electrical system for use in a vehicle, the electrical system comprising:
   a capacitance between a first voltage rail and a second voltage rail, the capacitance having a stored energy;
   an inverter module, the inverter module having a phase leg, wherein the phase leg includes:
      a first transistor coupled to the first voltage rail, the first transistor having a first gate terminal and a first threshold voltage; and
      a second transistor coupled between the first transistor and the second voltage rail, the second transistor having a second gate terminal and a second threshold voltage; and
   a control circuit coupled to the inverter module, the control circuit being configured to:
      apply a constant voltage to the first gate terminal, the constant voltage being greater than the first threshold voltage;
      apply a control voltage to the second gate terminal, the control voltage being initially less than the second threshold voltage; and gradually increase the control voltage to a voltage greater than the second threshold voltage, such that the second transistor is gradually activated and the stored energy is gradually dissipated through the first transistor and the second transistor.

13. The electrical system of claim 12, wherein the control circuit is configured to linearly increase the control voltage.

14. The electrical system of claim 13, wherein the control circuit is configured to linearly increase the control voltage over a time period being less than three seconds.

15. The electrical system of claim 12, wherein the constant voltage is less than a saturation voltage for the first transistor.

16. A method for discharging an energy potential between a first voltage rail and a second voltage rail using an inverter phase leg including a first transistor coupled to the first voltage rail and a second transistor coupled between the first transistor and the second voltage rail, the inverter phase leg being controlled by a gate driver circuit, the method comprising:
    detecting a discharge condition; and
    setting the gate driver circuit to a discharge mode in response to detection of the discharge condition, wherein the energy potential is gradually dissipated through the inverter phase leg by:
        applying a first voltage to a gate terminal of the first transistor, the first voltage being less than a threshold voltage of the first transistor; and
        gradually increasing voltage at the gate terminal to a second voltage, the second voltage being at least equal to the threshold voltage of the first transistor.

17. The method of claim 16, wherein setting the gate driver circuit to the discharge mode comprises switching from a normal operating mode for the inverter phase leg to the discharge mode.

18. The method of claim 16, wherein:
    gradually increasing voltage at the gate terminal comprises linearly increasing voltage from the first voltage to the second voltage over a time period; and
    setting the gate driver circuit to the discharge mode comprises applying a constant voltage to a gate terminal of the second transistor, the constant voltage being greater than a threshold voltage for the second transistor.

19. The method of claim 16, further comprising applying a constant voltage to a gate terminal of the second transistor, the constant voltage being greater than a threshold voltage for the second transistor.

20. A method for discharging an energy potential between a first voltage rail and a second voltage rail using an inverter phase leg including a first transistor coupled to the first voltage rail and a second transistor coupled between the first transistor and the second voltage rail, the method comprising:
    detecting a discharge condition; and
    setting the gate driver circuit to a discharge mode in response to detection of the discharge condition, wherein the energy potential is gradually dissipated through the inverter phase leg by:
        applying a first voltage to a gate terminal of the first transistor, the first voltage being greater than a threshold voltage of the first transistor; and
        applying a voltage pulse at a gate terminal of the second transistor, the voltage pulse having a duration such that the second transistor does not operate in a saturation mode and the energy potential is gradually dissipated through the inverter phase leg.

* * * * *